United States Patent [19]

Zuhone et al.

[11] 4,282,936
[45] Aug. 11, 1981

[54] QUICK ACTING COUPLER FOR CULTIVATOR ATTACHMENT

[76] Inventors: Daniel M. Zuhone; Mark S. Coleman, both of R.R. 4, Mattoon, Ill. 61938

[21] Appl. No.: 50,460

[22] Filed: Jun. 20, 1979

[51] Int. Cl.³ .............................................. A01B 39/26
[52] U.S. Cl. ..................................... 172/512; 172/753; 172/763; 172/624.5; 172/646; 248/223.1
[58] Field of Search ............... 172/272, 273, 763, 749, 172/750, 751, 753, 646, 508, 509, 510, 624, 661, 657; 211/192; 248/222.4, 223.1

[56] References Cited

U.S. PATENT DOCUMENTS

| | | | |
|---|---|---|---|
| 874,014 | 12/1907 | Kurtzon | 248/222.4 |
| 2,417,597 | 3/1947 | Hill | 172/513 |
| 2,465,043 | 3/1949 | Schumacher | 172/513 |
| 2,781,712 | 2/1957 | Thomas | 248/222.4 |
| 2,805,614 | 9/1959 | Lipetzky | 172/513 |
| 3,203,487 | 8/1965 | Whitesides | 172/624 |
| 3,392,848 | 7/1968 | McConnell | 248/223.1 X |
| 3,539,019 | 11/1970 | Mattson | 172/512 |
| 3,595,321 | 7/1971 | Dickey | 172/513 |
| 3,719,234 | 3/1973 | Neece | 172/135 |
| 4,126,190 | 11/1978 | Wylie | 172/624 |
| 4,193,456 | 3/1980 | Anakenman | 172/494 |

*Primary Examiner*—Richard J. Johnson
*Attorney, Agent, or Firm*—William B. Cunningham, Jr.

[57] ABSTRACT

A quick acting coupler for a cultivator attachment, such as a cultivator fender, shield, or the like, in which the attachment is carried by a mounting frame with the latter being securable to the tool or cultivator bar of a cultivator implement for coupling of the attachment to the cultivator at a desired location on the cultivator. The coupler includes a hitch member for each attachment, each hitch member being securable to the tool bar of the cultivator at a desired position therealong. The mounting frame is connected to the hitch member by inserting one or more headed pins carried by the mounting frame into corresponding elongate vertical slots in the hitch member. The vertical slots each have an enlarged portion at their upper ends so as to receive the head of a respective headed pin and a narrower lower portion so as to receive the shank of the headed pin. Thus the headed pins, when properly installed with their shanks received in the narrow portions of their respective slots, effectively prevent fore and aft and sidewise relative movement between the hitch member and the mounting frame. A pin is then inserted through holes in both the hitch member and the mounting frame which are in line with one another thus preventing vertical movement between the hitch member and the mounting frame. For uncoupling, this last-mentioned pin is removed and the mounting frame in the cultivator attachment mounted thereon is lifted clear of the cultivator as a unit.

10 Claims, 6 Drawing Figures

QUICK ACTING COUPLER FOR CULTIVATOR ATTACHMENT

BACKGROUND OF THE INVENTION

This invention relates to a system for the quick coupling of one or more attachments to an agricultural implement at a desired location on the implement, and more particularly relates to a mounting system for the ready attachment and removal of cultivator fenders or the like to the cultivator tool bar of a row crop cultivating implement.

In growing of row crops, such as corn, soy beans, and the like, the ground between the rows of crops is routinely cultivated (i.e., dug up) one or more times while the crop is growing so as to prevent excessive weed growth in the field and so as to condition the soil for more readily soaking up and retaining moisture. Fields are conventionally cultivated by attaching a cultivating implement (oftentimes referred to merely as a cultivator) to a tractor or other prime mover and then driving the tractor through the fields in a direction parallel to the rows. Cultivators typically include a tool or cultivator bar or beam which extends transversely of the direction of movement of the tractor and spans several rows of crops to be cultivated. For example, a tractor with a modern cultivator may readily simultaneously cultivate up to 16 or 24 rows of crops. The cultivator includes a number of cultivator shoes or shovels which are supported from the tool bar and which are so positioned as to engage the ground between the rows of crops without interferring with the crops growing in the rows. Cultivators are usually mounted on the tractor by means of a conventional 3 point hitch arrangement so the tractor operator may selectively lift the cultivator to a raised position in which the cultivating tools are clear of the ground and above the rows of crops being cultivated or lower the cultivator to a cultivating position in which the cultivator tools engage the soil between the rows of crops for cultivation. As the tractor is driven through the field with the cultivator in its cultivating position, the cultivating tools or shovels, of course, penetrate the soil and dig it up. As the cultivator tools move through the soil, and especially at high tractor speeds, clods of dirt erupt from the cultivator tools and are thrown outwardly with sufficient force so as to damage young plants in the crop rows.

As is well known, various types of shields and fenders have been developed to prevent the erupting dirt from the cultivator tools from damaging the rows of crops. At the same time, these shields have permitted cultivation at even higher tractor speeds thus increasing the productivity of the cultivating operation.

Reference may be made to such U.S. Pat. Nos. as 2,417,597, 2,465,043, 2,805,614, 3,539,019, 3,595,321 and 3,719,234 which disclose various prior art cultivator shields and fender arrangements.

In many farming operations, it is a common practice to have various types of crops, such as soy beans and corn, under cultivation at one time. However, at different times of the growing season it may be necessary to use a cultivator shield for cultivating, for example, soy beans while it may not be possible to use cultivator shields for cultivating other crops, such as corn, which may be more mature. Thus, when the operator switches from cultivating one crop to another, it may be necessary to install or remove the cultivator shields.

Typically, cultivator shields are held in place on the tool bar of the cultivator by means of U-bolts which fit around the tool bar and which when tightened securely hold the cultivator fender in a desired position on the cultivator so as to line up with the rows of crops being cultivated. As heretofore noted, modern cultivators can include up to 16 or 24 rows of crops. Thus, the installation or removal of 16 or 24 cultivator shields turns out to be a time consuming job. In actual practice, it has been found that considerable time is oftentimes required to install the cultivator shields and to align them in their proper position on the cultivator tool bar so that they line up in proper relation to the rows of crops. It is further noted that positioning of the cultivator shields on the cultivator tool bar is critical or otherwise the cultivator shields themselves may cause damage to the rows of crops.

Also, due to changing weather and soil conditions, decisions relating to when to cultivate must be quickly made and the cultivating operation quickly carried out. Thus, in certain instances, time is of the essence in installing or removing cultivator shields.

SUMMARY OF THE INVENTION

Among the several objects and features of this invention may be noted the provision of a system for the quick coupling and uncoupling of a cultivator attachment, such as a cultivator fender or shield, to a cultivating implement which may be readily accomplished by one person without the requirement of even simple hand tools;

The provision of such a quick coupling system which insures that the attachments will be properly installed on the cultivator in predetermined positions to accurate align with the rows of crops being cultivated;

The provision of such a system which securely attaches the cultivator fenders to the cultivator;

The provision of such a system which may be readily retrofitted on existing cultivator fenders;

The provision of such a system which holds the cultivator fenders in a desired position relative to the cultivator and yet which permits the cultivator fender to move freely in response to encountering obstructions in the field while cultivating;

The provision of such a coupling system which enables one person to install or remove a series of cultivator shields on or from a cultivator in only a fraction of the time required with prior securement systems; and, in general, The provision of such a system which is of simple, rugged, and which is reliable in operation.

Briefly, this invention relates to a system for easily and quickly coupling and uncoupling a cultivator attachment, such as a cultivator shield or fender, to a cultivator. The latter includes a frame adapted to be hitched to a tractor or other prime mover for movement of the cultivator through a field to be cultivated. The coupling system of this invention comprises a hitching member adapted to be securely connected to said cultivator frame at a desired location thereon for attachment of the cultivator attachment to the cultivator frame at a desired location. The hitching member has a generally vertical portion thereof facing transversely of the cultivator. The system further includes a mounting frame for the cultivator attachment, this mounting frame including a vertical member having a portion thereof adapted to be disposed in face-to-face relation with the hitching member. Quick acting fastening means is provided for the ready securement of the hitching member and the vertical member and for the ready unhitching thereof. This fastening means comprises at least one headed fastener secured to and extending from either one of the last-mentioned members and an elongate slot in the other of these members with the slot having an enlarged portion for reception of the head of the fastener and a narrow portion for receiving the shank of the fastener. The hitching member and the vertical member each have a hole therethrough which are in register with one another when the headed fastener is received in its slot. The system of this invention further comprises a fastener removably insertable through these last-mentioned holes whereby upon the headed fastener being inserted in its slot and upon insertion of the removable fastener in its respective holes, the cultivator attachment is rigidly secured to the hitching member.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
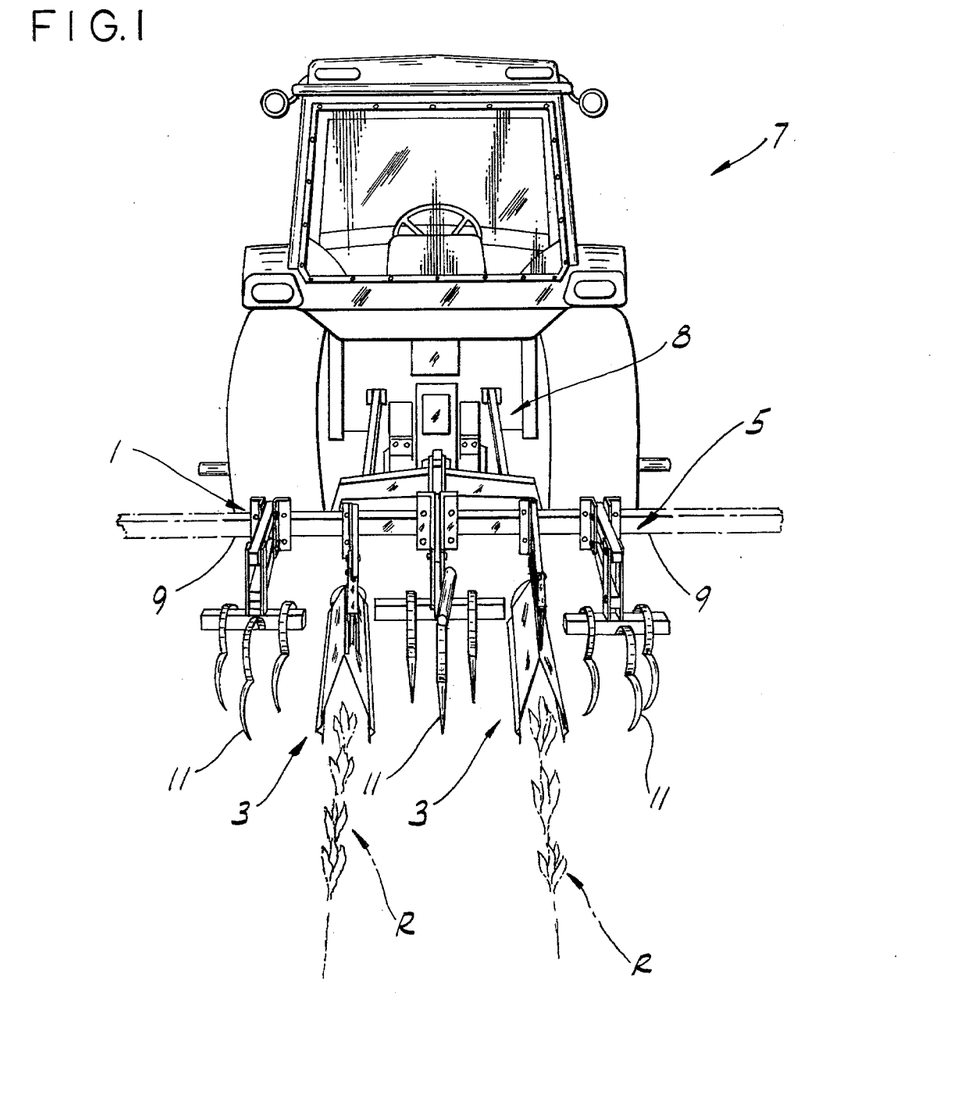
FIG. 1 is a rear perspective view of a tractor or other prime mover moving through a field to be cultivated, the tractor having a row crop cultivator implement hitched thereto and being disposed in a cultivating position, the cultivator having a tool bar and a plurality of cultivator shields connected thereto by means of the quick coupling system of the present invention.

Referring now to the drawings, a mounting or coupling system of this invention, indicated in its entirety by reference character 1, is illustrated for the easy and quick coupling and uncoupling of an attachment 3 to an implement 5 (see FIG. 1). As shown, implement 5 is a row crop cultivator adapted to be hitched to a tractor 7 (or other prime mover) via a conventional three point hitch assembly 8 as is normally provided on modern farm tractors.

Implement or cultivator 5 is conventional and does not per se constitute an integral part of this invention. As shown in the context of the present invention, however, cultivator 5 comprises a frame including a tool bar or cultivator beam 9 which extends transversely of the direction of travel of tractor 7 for a considerable distance. Beam 9 may span a number of rows R of crops planted, for example, on 30 inch (76 cm.) centers. As shown, cultivator 5 simultaneously cultivates four crop rows R, but it will be understood that larger cultivators, such as are in common use, may simultaneously cultivate up to 24 rows. The cultivator includes a plurality of cultivator tools or shovels 11 which are fastened to the tool bar for digging (i.e., cultivating) the soils between the crop rows. The entire cultivator is mounted on hitch 8 of tractor 7 in such manner that upon raising and lowering of the hitch, the cultivator may be readily raised and lowered between a raised retracted position (not shown) in which all of the cultivator tools 11 are clear of the soil and a lowered cultivating position (as shown in FIG. 1) of which the cultivating tools are in cultivating engagement with the soil.

Cultivator attachments 3 are herein shown to be tent-type row crop shields, but it will be understood that they could be rolling crop shields, cultivator fenders, crop guides, spray attachments or any other attachment which is normally carried by an implement for any number of desired purposes. As shown, each tent-type cultivator shield 3 is an elongate one piece, V-shaped member made of sheet metal or the like having two spaced side portions 13a, 13b and a closed top portion 13c interconnecting the sides. The sides are spaced apart a distance sufficient to accommodate a row R of crops therebetween. The front ends of the side portions 13a, 13b are curved so as to permit the cultivator fender to freely pass over the soil without the front portion of the cultivator digging into the soil. A pair of mounting stubs 15a, 15b project upwardly from the top portion 13c of the shield and are rigidly secured (e.g., welded) thereto. A horizontal bar 17 is secured to the mounting stubs and this horizontal bar has a series of holes 19 therethrough extending substantially the length thereof for purposes as will appear. An upright mounting bar 20 extends vertically upwardly from bar 17 intermediate its ends. A pair of horizontal links 21a and 21b is pivotally secured to upright bar 20 by respective pivot pins or bolts 22a, 22b. Each of the links 21a, 21b is comprised of a pair of bars or straps disposed on either side of upright mounting bar 20. Thus far described, cultivator attachment 3 is conventional.

Mounting system 1 of this invention, as shown in FIGS. 2-5, for mounting a single cultivator attachment 3 includes a hitch means, as generally indicated at 23, mounted in a desired position or location on tool bar 9 and a mounting frame, as generally indicated at 25, on which a cultivator attachment or fender 3, such as above described, is adapted to be mounted. Hitch means 23 is shown to comprise a generally vertically disposed hitch member 27 made of angle iron or the like which is clampingly secured in a desired position on tool bar 9 by means of a U-bolt 29 or the like which fits around the front, top, and bottom of the rectangular cross-section tool bar. Hitch member 27 includes a pair of spaced holes 31 therein adapted to receive the threaded ends of U-bolt 29. A pair of nuts 33a, 33b (see FIG. 3) are threaded on the ends of the U-bolt. Hitch member 27 is shown to be an angle member having a first leg or flange 27a thereof adapted to fit on the rear face of tool bar 9 and a second leg or flange 27b extending generally vertically and having at least one face thereof which faces transversely of the cultivator (i.e., faces sidewise). Leg 27a has the above-mentioned holes 31 therethrough for reception of U-bolt 29 and leg 29b has a pair of elongate vertical slots 35a and 35b therethrough. Each slot 35a, 35b has an enlarged upper end 37 and a narrower lower portion 39.

Figure 4:
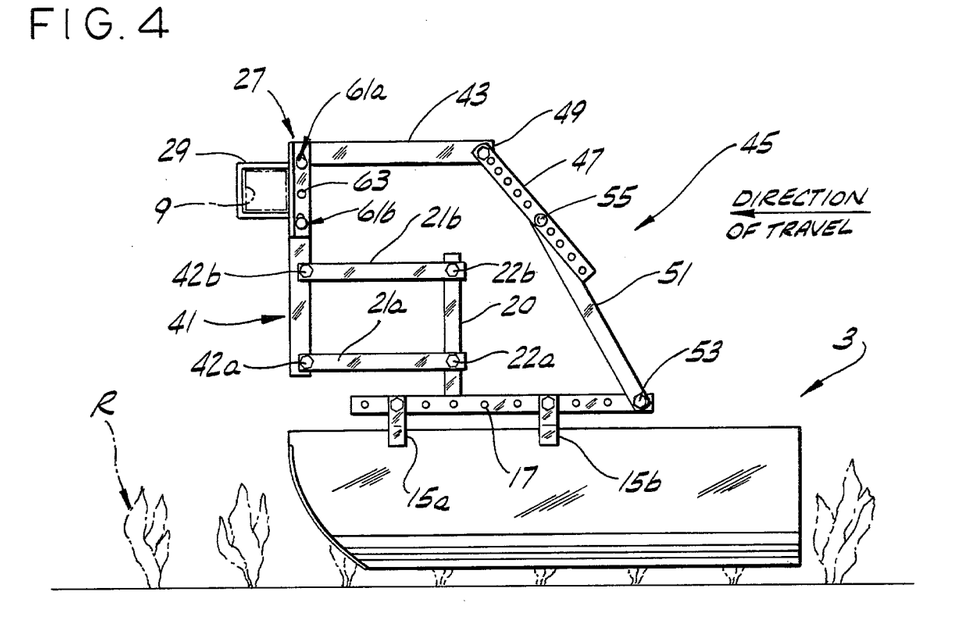
FIG. 4 is a side elevational view of a cultivator fender coupled to the tool bar or frame of a cultivator by coupling system of the present invention, the fender being in its normal operating position.

Mounting frame 25 comprises an upright frame member 41, the latter shown to be of angle iron construction having a first flange or leg 41a adapted to be fitted on the rear face of tool bar 9 and another leg 41b extending in front to rear direction of the cultivator and having its sides facing generally transversely of the cultivator. Preferably, upright frame member 41 is somewhat longer than hitch member 27 and it cooperates with the hitch member for the securement of cultivator shield 3 to tool bar 9. As shown in FIG. 4, upright member 41 extends down below hitch member 27 and is adapted to have the forward ends of links 21a and 21b pivotally secured to leg 41b thereof by bolts 42a, 42b. Thus, upright bar 20, links 21a and 21b, and upright frame member 41 with the pivotal connections as above described constitute a parallelogram linkage L for connecting shield 3 to mounting frame 25.

Mounting frame 25 further comprises an upper horizontal member 43 rigidly secured (e.g., welded) to the upper end of upright member 41 and it extends rearwardly therefrom. Further in accordance with this invention, a toggle linkage, as generally indicated at 45, is pivotally interconnected between the rear end of upper horizontal frame member 43 and a selected location (e.g., a selected hole 19) along horizontal bar 17 on shield 3. As shown, toggle linkage 45 includes an upper link 47 pivotally connected to frame member 43 by a pin or bolt connection 49 and a lower link 51 pivotally connected to bar 17 by a pin or bolt connection 53. Pin 53 is shown to be adapted for insertion through a selected hole 19 in bar 17 for adjustment purposes. Bars 47 and 51 are pivotally connected together at the "knee" of the toggle linkage by a pin 55. As illustrated, link 51 is an elongate bar and link 47 may be formed from platelike material so as to be folded double with sufficient space between its sides for freely receiving bar 51. A series of holes 57 is provided in link 47 so as to permit adjustment of the length of toggle linkage 45. Preferably, the toggle linkage is positively maintained in a configuration in which its "knee" is broken outwardly (i.e., the toggle is prevented from moving to its "center" position). This may be accomplished by forming a tab (not shown) on the sides of link 47 at the very bottom of the link which prevents the bar 51 from fully moving into link 47 and from becoming in line (i.e., coaxial) with bar 51. Operation of the above-described toggle linkage and parallelogram will hereinafter be described.

Further in accordance with this invention, means, as indicated at 59, is provided for the quick coupling and uncoupling of frame 25 to tool bar 9 without the use of even simple hand tools in which a number of shields 3 may be readily installed on the cultivator at desired locations along the tool bar. Generally, coupling means 59 comprises one or more headed pins 61a, 61b rigidly secured to upright frame member 41 which fit in corresponding elongate slots 35a, 35b in hitch member 27 thereby to effectively prevent relative movement between mounting frame 25 and hitch member 27 in both front-to-rear and in side-to-side (transverse) directions. Means 59 further comprises a pin 63 which is received in holes 65 provided in both members 27 and 41, this pin positively preventing relative vertical movement of frame 25 and member 27 so as to securely hitch the frame to the cultivator.

Figures 2, 3:
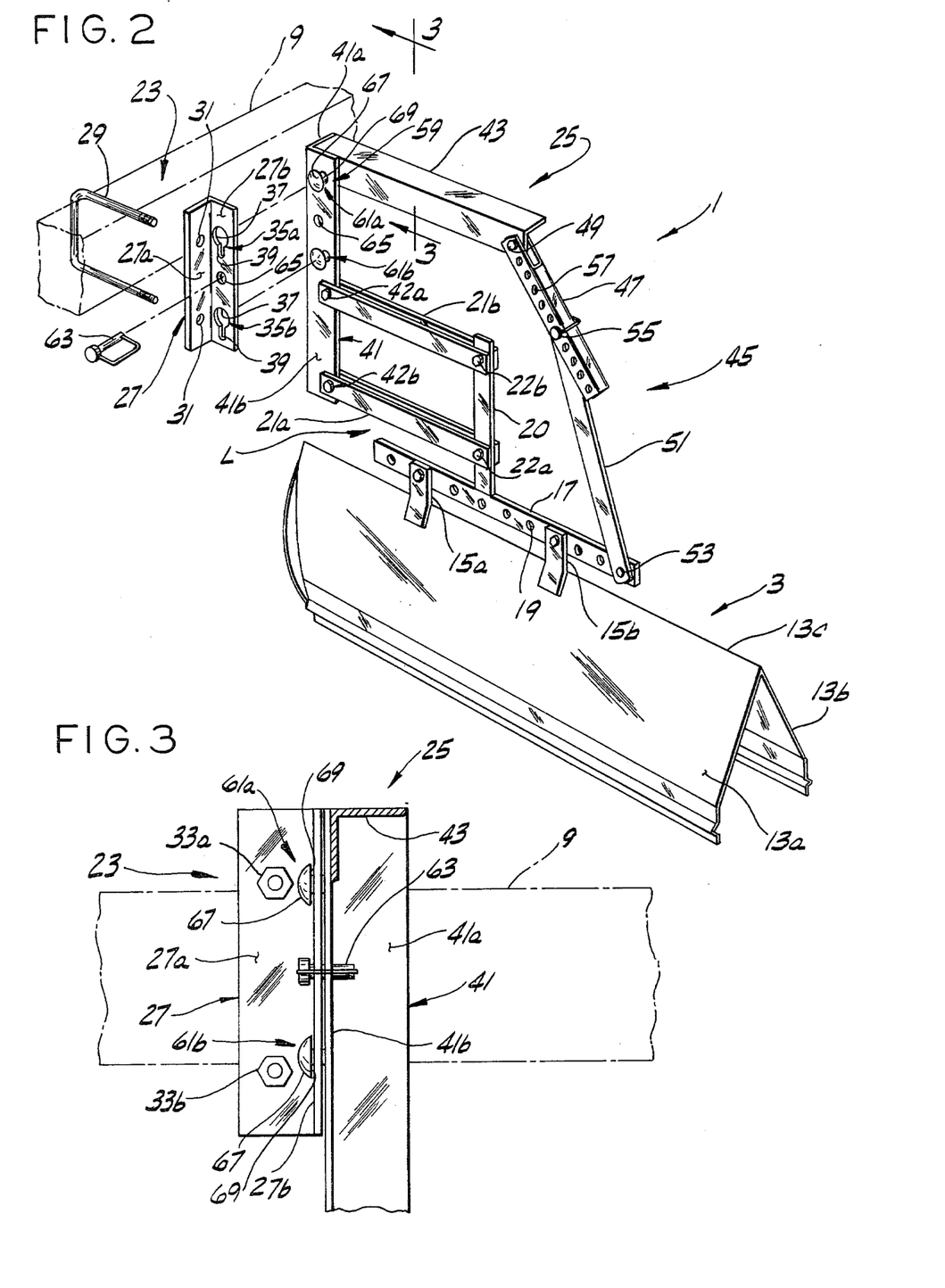
FIG. 2 is an enlarged rear perspective view illustrating a first embodiment of the coupling system of this invention.
FIG. 3 is an enlarged view taken along line 3—3 of FIG. 2 illustrating the coupling system of the present invention when the cultivator fender is coupled to the cultivator.

More particularly, headed pins 61a and 61b are shown to be rigidly secured to one transverse face of leg 41b of vertical member 41 on the side toward leg 27b of hitch member 27 when the mounting frame is in its installed position on the cultivator (as shown in FIG. 3). Each pin 61a or 61b includes an enlarged head 67 and a shank 69 which spaces the head outwardly from leg 41b a distance somewhat greater than the thickness of leg 27b (see FIG. 3). Pins 61a and 61b are spaced on leg 41b so as to mate or align with their corresponding elongate slots 35a and 35b in leg 27a. Enlarged portions 37 of slots 35a and 35b are of sufficient size so as to allow heads 67 of respective pins 61a, 61b to pass freely therethrough. The narrow portions 39 of the slots snugly receive the shank portions 69 of their respective pins. Thus, the sides of the narrow slot portions 37 engage the shanks of the pins so as to prevent fore and aft relative movement between frame 25 and hitch member 27. Still further, with heads 67 of pins 61a and 61b being wider than the narrow slot portions 39, the pin heads and leg 41b of member 41 prevent (or limit) sidewise relative movement between vertical member 41 and hitch member 27. As herein described, pins 61a, 61b were described as being carried by vertical member 41 and slots 35a, 35b were provided in hitch member 27. However, it will be appreciated that the pins may be carried by the hitch member and the slots may be provided in the vertical member.

With pins 61a, 61b received in their respective slots 35a, 35b as heretofore described, holes 65 in legs 27b and 41b are in line with one another and thus pin 63 may be readily inserted through these holes so as to pin or lock frame 25 to hitch member 27 against vertical relative movement.

As herein shown, pins 55 and 63 preferably are each provided with a safety clip which is readily removable so as to permit insertion and removal of the pins into and from their respective holes and which, when in place, positively prevents the pins from becoming removed from their respective holes.

The use of the coupling and uncoupling system 1 of the present invention will now be described. It will be assumed that hitch members 27 with their respective U-bolts 29 have already been secured on tool bar 9 of the cultivator so as to properly locate cultivator shields 3 in proper position on the cultivator so as to protect rows R of crops when the cultivator shields are mounted on the cultivator. It will be understood that hitch members 27 remain in place on the tool bar even when the cultivator shields 3 are removed or uncoupled therefrom and it will be further understood that the hitch members do not in any substantial way interfere with the operation of the cultivator.

When it is desired to couple a cultivator shield 3 to cultivator 5, a mounting frame 25 with a respective cultivator shield 3 already secured thereto is moved into position adjacent hitch member 27, generally as shown in FIG. 2. Upright member 41 is maneuvered into position so that headed pins 61a and 61b are in register with the enlarged portions 37 of elongate slots 35a and 35b and the adjacent upright faces of legs 27b and 41b of hitch member 27 and vertical member 41 are brought into face-to-face engagement so that heads 67 of the head pins extend through the enlarged portions of slots 35a and 35b. Then, mounting frame 25 is moved downwardly (i.e., dropped into position) so that the narrow portions 39 of slots 35a and 35b receive shanks 69 of the headed pins. With the mounting frame so positioned on hitch member 27, holes 65 in legs 27b and 41b are in line with one another and thus permitting pin 63 to be readily inserted therethrough thus completing coupling of the shield to the cultivator. In this manner, mounting frame 25 and thus cultivator shield 3 is rigidly attached to the cultivator tool bar, is held in upright position, and is ready for cultivating. To remove the cultivator shield from the cultivator, the above-described coupling process is reversed by first removing pin 63, and then manually lifting mounting frame 25 relative to hitch member 27 so as to move the pins upwardly in slots 35a, 35b. When the heads 67 of pins 61a, 61b enter into the enlarged portions 39 of the slots, the mounting frame is moved sidewise so as to withdraw the headed pins from the slots thereby freeing the mounting frame and the cultivator shield from the cultivator. It will be appreciated that an entire series of cultivator fenders 3 may be readily coupled to or uncoupled from a cultivator in a matter of minutes without the use of even simple hand tools by one person. It will further be appreciated that with hitching members 27 accurately positioned on tool bar 9, cultivator fenders 3 will be properly positioned on the cultivator and be ready for cultivation as soon as they are hitched as above-described.

The purpose of toggle link 45, the structure of which was heretofore described, is two-fold. First, this toggle link, when adjusted to a desired length, holds the fender 3 in a desired elevation, as shown in FIG. 4. More specifically, it is normal practice to mount fenders 3 in such manner that the bottom edges of their side portions 13a, 13b are in close proximity to, but are preferably not touching the ground on either side of the row R of crops to be protected. Preferably, the bottoms of the cultivator fender should remain about 1 inch (2.5 cm.) or so above the ground. With the cultivator 5 in its desired cultivating position, the length of toggle link 45 is adjusted by removing pin 55 and by adjusting the overall length of the toggle linkage so that preferably the cultivator fender is generally level and so the toggle linkage is nearly in its straight or extended position so as to hold the cultivator shield above the ground. It will be appreciated that cultivator bar 9 may be at different elevations above the level of the ground and that cultivator tools 11 may be adjusted relative to the cultivator bar so that the cultivator bar clears the crops being cultivated and so that the cultivator tools are in cultivating contact with the ground. This change in height of the cultivator bar necessitates the requirement for being able to adjust the length of toggle linkage 45 so as to vary the height of shields 3 in their normal cultivating positions. In addition, it may be necessary to move the location of attachment stubs 15a and 15b along the length of bar 17 by attaching the stubs to different holes 19 in bar 17.

Figure 5:
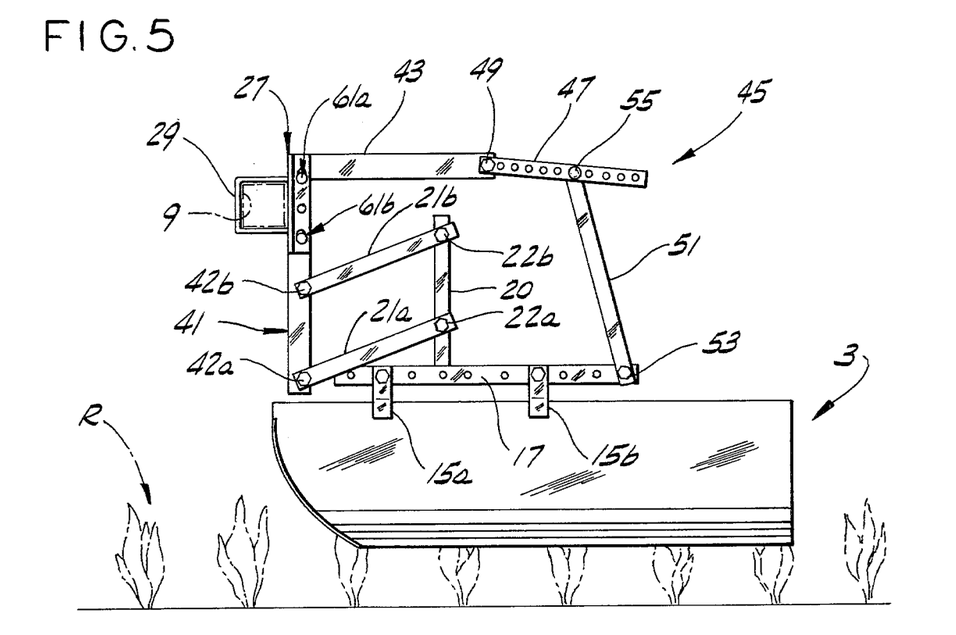
FIG. 5 is a view similar to FIG. 4 illustrating the cultivator fender in a tripped position in which lumps of dirt or other obstructions are automatically cleared from the fender.

In operation, with tractor 7 moving through the field and with cultivator 5 cultivating the soil, oftentimes accummulations of soil, weeds, and dirt clods build up under or within cultivator shield 3 and these accumulations may interfere with or damage rows of crops R. In accordance with mounting frame 25 of this invention, toggle linkage 45 permits the cultivator shield to freely swing upwardly as shown in FIG. 5 thereby to enable the obstructions to pass freely out from under the cultivator shield. Once the obstructions have cleared the shield, the shield will return by the force of gravity to its normal cultivating position as shown in FIG. 4. The purpose of horizontal member 43 is to provide a pivotal attachment point for the upper end of toggle linkage 45. This rearward pivot connection of the upper end of the toggle linkage is preferred so that the toggle linkage does not interfere with parallelogram linkage L and in particular with upright member 20 attaching the front of the cultivator shield to the mounting frame 25. It will be understood, however, that in other designs the toggle linkage may be connected directly to upright frame member 41 or member 43 may be of shorter length.

Figure 6:
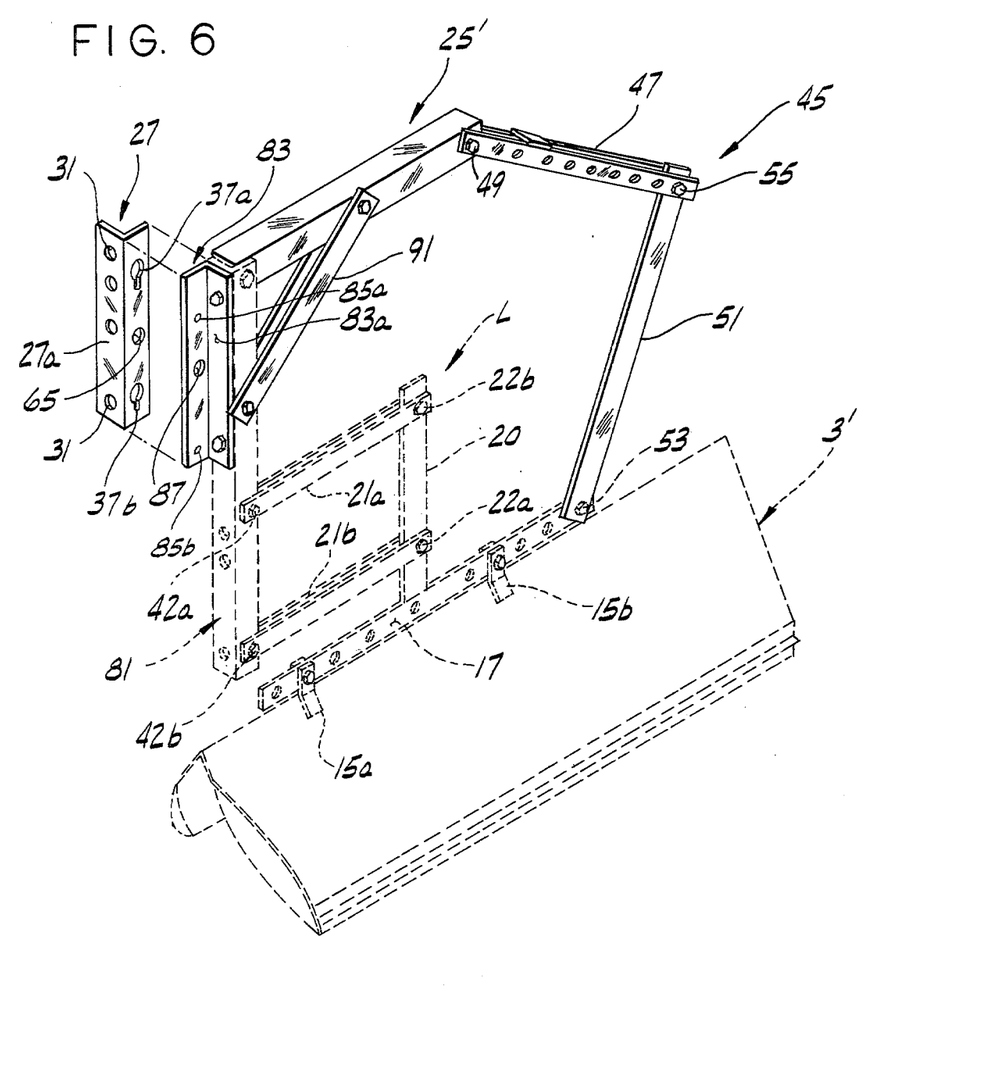
FIG. 6 is a perspective view of a second embodiment of the coupling system of the present invention which may be readily retro-fitted to conventional fenders, the fender being illustrated in its tripped position.

Referring now to FIG. 6, a modification of the coupling system of the present invention is illustrated which is particularly intended for retro-fit on conventional cultivator shields 3, such as is shown in dotted lines with reference characters 13–22 indicating parts of similar construction and function as heretofore described. Shield 3 includes an upright member 81 which is pivotally secured to links 21a and 21b by bolts 42a, 42b. Thus, upright member 81 together with links 21a, 21b and upright bar 20 constitute parallelogram linkage L as heretofore described.

In accordance with the retro-fit version of the coupler of this invention, a vertical adapter member 83 is provided which is secured (bolted) in place on the front face of upright member 81. Preferably, holes already provided in upright member 81 are utilized in bolting adapter member 83 in place. The latter is an angle-shaped member having a rear flange or leg 83a adapted to bear on member 81 and a forward extending flange 83b having transverse facing sides. A pair of spaced headed pins 85a, 85b, generally similar to pins 61a, 61b heretofore described, are provided on flange 83b of the adapter member to be received in slots 35a, 35b in hitch member 27. Further, adapter member has a hole 87 therethrough positioned to be in line with hole 65 in hitch member 27 when pins 85a, 85b are properly received in slots 35a, 35b so as to receive removable pin 63. Thus, shield 3' is readily coupled to tool bar 9 in the same manner as heretofore described.

Further in accordance with the retro-fit version of the quick coupler of this invention, a modified mounting frame 25' is provided. This modified frame includes adapter member 83 heretofore described, a horizontal member 89 extending rearwardly from upright member 81, and an angle brace 91 extending between vertical member 81 and horizontal member 89. Toggle linkage 45 is connected to the rear end of horizontal member 89 by bolt 49 in the manner heretofore described.

While tool bar 9 herein was known to be of generally rectangular cross-section, it will be understood that with proper modification such as would be readily apparent to one of ordinary skill, the mounting system of the present invention could readily be adapted for use with tool bars of any desired cross section.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

We claim:

1. A system for easily and quickly coupling and uncoupling a cultivator attachment, such as a cultivator shield or fender, to a cultivator, the latter including a cultivator frame adapted to be hitched to a tractor or other prime mover for movement of the cultivator through a field to be cultivated, said cultivator frame including a generally horizontal tool bar extending transversely of the direction of travel of the prime mover substantially the entire width of said cultivator, said coupling system comprising a hitching member adapted to be securely fastened to said tool bar at any desired location therealong for attachment of said cultivator attachment to said tool bar at any desired position along said tool bar, a mounting frame for said cultivator attachment, said mounting frame including a vertical member having a vertical portion thereof adapted to be disposed relative to said hitching member for securement of said cultivator attachment to said cultivator frame, and quick acting fastening means for the ready securement of said hitching member and said vertical member together and for the ready uncoupling thereof, said fastening means comprising pin and slot fastener means including a headed pin extending in generally transverse direction from either said vertical member or from said hitching member, said headed fastener having a shank and an enlarged head on said shank with said head being spaced from the member on which said pin is secured, the other of said members having a lot therein for reception of said headed fastener, said slot including an enlarged portion for reception of said head and a narrower portion for receiving said shank, further, said hitching member and said vertical member each having a hole therethrough, these last-said holes being in register with one another when said headed fastener is received in said slot, and a removable fastener insertable through said holes whereby upon said headed fastener being inserted in its respective slot and upon said removable fastener inserted through its respective holes, said cultivator attachment is rigidly secured to said tool bar at said desired position therealong.

2. A coupling system as set forth in claim 1 wherein said hitching member is adapted to be disposed on the rear of said tool bar, and wherein said system further includes means for clampingly securing hitching member to said tool bar.

3. A coupling system as set forth in claim 2 wherein said clamp means comprises a U-bolt adapted to fit around said tool bar and to be threadably engageable with said hitching member for securement of the latter to said tool bar.

4. A coupling system as set forth in claim 2 wherein said hitching member has a portion thereof constituting a vertical planar surface, the latter having a plurality of said slots therein, said slots being generally vertical and having their enlarged portions at the upper ends thereof, said vertical member having a portion thereof adapted to be in face-to-face relation with the above said planar portion of said hitching member, said vertical member having a plurality of said headed fasteners secured thereto, one for each of said slots, with said headed fasteners extending sidewise from said planar portion of said hitching member and being so positioned thereon for reception in said slots.

5. A coupling system as set forth in claim 1 wherein said cultivator attachment mounting frame is adapted to carry said cultivator attachment in such manner as to permit said cultivator attachment to move generally upwardly and downwardly relative thereto, said mounting frame including a toggle linkage adapted to interconnect said cultivator attachment and said vertical member for holding said cultivator attachment at a desired position and for permitting the cultivator attachment to freely move upwardly so as to permit obstructions to move clear of said cultivator attachment while the latter is being moved through a field while cultivating, said toggle linkage comprising a pair of toggle members pivotally secured together with one of the toggle members being pivotally connected relative to said mounting frame and with the other of the toggle members being pivotally secured to the rear portion of said cultivator attachment, said toggle linkage further comprising means for preventing said toggle members from being in line with one another thereby to ensure that said cultivator attachment is at all times free to move upwardly.

6. A coupling system as set forth in claim 5 wherein one of said toggle members has a series of spaced holes therethrough permitting the other of said toggle members to be secured thereto at any one of a number of positions so as to enable the adjustment of the length of said toggle linkage.

7. A frame for mounting a cultivator fender or shield to cultivator, the latter including a transverse beam extending perpendicular to the direction of travel of the cultivator as it is moved through a field for cultivation purposes, said mounting frame including a upright member adapted to be hitched to said transverse beam of said cultivator, and a linkage interconnected between said vertical member and the rear portion of said shield, said linkage comprising a pair of links pivotally connected together, one of said links being pivotally connected to said upright member and the other of said links being privotally secured to the rear portion of said shield, said linkage holding the rear portion of said shield in a desired postion and yet permitting the cultivator fender to freely move upwardly when said fender encounters an obstruction in the field, said linkage further comprising means for preventing said links of said linkage from being in line with one another thereby to ensure that said shield is at all times free to move upwardly.

8. A frame as set forth in claim 7 wherein one of said links of said linkage has a series of spaced holes therethrough permitting said other link to be secured thereto at any of a number of positions so as to permit adjustment of said shield.

9. A frame as set forth in claim 7 further comprising an upper horizontal member extending in rearward direction from the upper end of said upright member, one of said links of said linkage being pivotally secured to said horizontal member.

10. A frame as set forth in claim 7 further including means for the quick coupling and uncoupling of the frame to said transverse beam at a desired location therealong, said coupling means comprising a generally vertical hitch member adapted to be secured to said transverse beam at a desired location therealong, said upright frame member having a portion thereof adapted to fit on said hitch member when said frame is coupled to said cultivator, either said hitch member or said upright member having at least one headed fastener member projecting outwardly therefrom in generally transverse direction, said headed member having an enlarged head and a shank, the other of the last mentioned members having a generally vertically disposed slot therein with an enlarged portion for reception of the head of said headed fastener member and a narrow portion for reception of the shank of the headed fastener such that with said headed fastener received in said slot side-to-side and fore-to-aft relative movement between said hitch member and said vertical member is effectively prevented, and another fastener adapted to secure said vertical member against relative movement to said hitch member when said headed fastener is in place within its slot whereby the mounting frame with said cultivator shield thereon may be readily coupled to said cultivator in a desired position merely by inserting said headed fastener in the enlarged portion of its respective slot, by moving the hitch and upright members relative to one another so that the shank portion of said headed fastener is received in the narrow portion of its respective slot, and by installing said other fastener.

* * * * *